Patented Nov. 14, 1950

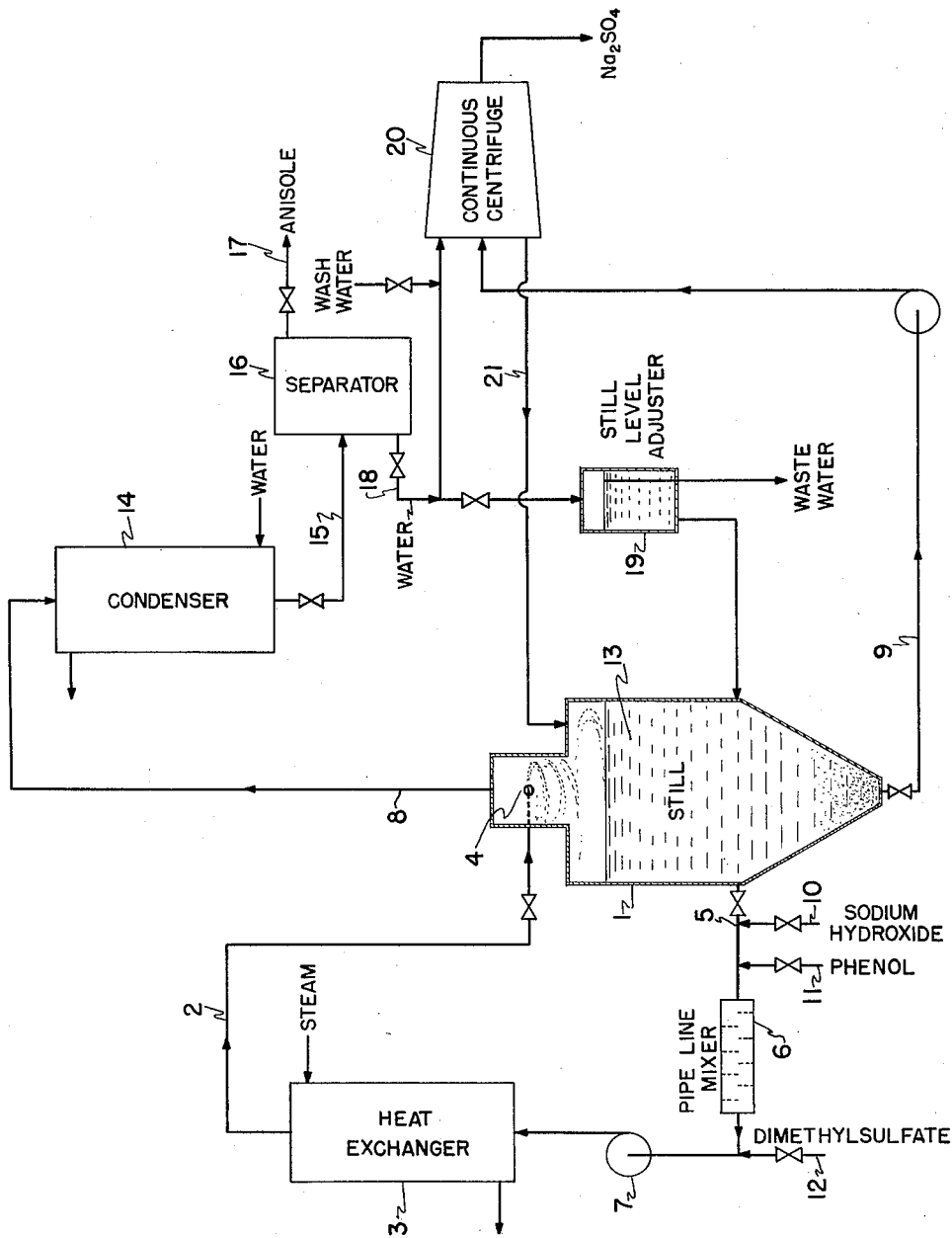

2,529,887

UNITED STATES PATENT OFFICE 2,529,887

PROCESS FOR THE PREPARATION OF ANISOLE

Walter D. Smutz, Warrensville Heights, Ohio, assignor to E. I. du Pont de Nemours & Company, Wilmington, Del., a corporation of Delaware Application May 19, 1949, Serial No. 94,226

7 Claims. (Cl. 260—612)

This invention relates to the manufacture of anisole. More particularly it relates to continuous processes in which a methylating agent for phenol is added continuously to a stream of refortified aqueous sodium phenate maintained in turbulent flow. The stream is heated to form anisole therein. The anisole is separated and unreacted aqueous sodium phenate is refortified by adding phenol and an alkaline sodium compound. A stream of the refortified aqueous sodium phenate is then recycled for admixture with the methylating agent.

This application is a continuation-in-part of my copending applications Serial No. 724,718, filed January 27, 1947, now U. S. Patent 2,490,842 issued December 13, 1949, and Serial No. 15,760 filed March 19, 1948, now abandoned.

It is an object of this invention to provide processes which are practical and economical for the commercial production of anisole in high yield using as reactants phenol, a methylating agent for phenol, and an alkaline sodium compound selected from the class consisting of sodium hydroxide and a sodium carbonate. Other objects and advantages of the invention will become apparent from the following description and accompanying drawing.

Processes of the invention are illustrated in the drawing on which there is shown in semidiagrammatical form an apparatus adapted for use in the practice of a preferred embodiment of the present invention. In the processes illustrated by the drawing, dimethyl sulfate is used as the methylating agent and the alkaline sodium compound employed is sodium hydroxide.

Having reference to the drawing, there will be seen as a central unit a still 1. The still has an inlet pipe 2 leading from the heat exchanger 3 into the upper part of the still at point 4 and an outlet pipe 5 leading thru a pipe line mixer 6 and a pump 7 to the heat exchanger 3, thus permitting a cyclic flow of materials. The still also has other outlet and inlet lines as will be more fully described later.

According to the processes of the invention illustrated in the drawing, an inlet pipe 2 conveys a heated aqueous reacting mass containing anisole, sodium phenate, and sodium sulfate from the heat exchanger 3 to the upper part of the still. The upper part of the still is preferably cylindrical and the heated reacting mass is expanded into this upper part tangentially at point 4, thus imparting a rotatory motion to the heated mass.

Upon expanding the heated mass into the still 1 at point 4, a mixture of anisole and water is vaporized or "flashed off" from the mass and leaves the still thru line 8. The unvaporized remainder of the mass which consists predominantly of aqueous sodium phenate and a small amount of sodium sulfate drops into the lower portion of the still which contains a large body of hot aqueous sodium phenate.

The base of the still is preferably conically shaped to facilitate the collection and withdrawal from the still of crystalline sodium sulfate which is a by-product of the anisole process. The sodium sulfate is withdrawn thru line 9 according to the embodiment of the invention illustrated in the drawing.

Hot aqueous sodium phenate is withdrawn from still 1 thru line 5. This hot aqueous sodium phenate is refortified by the addition of sodium hydroxide thru line 10 and phenol thru line 11. The sodium hydroxide and phenol are added in substantially stoichiometric proportions and in amount sufficient to maintain the sodium phenate strength in the refortified solution at a predetermined value. After an intimate mixing of the newly added sodium hydroxide and phenol, as in pipe line mixer 6, to give the refortified hot aqueous sodium phenate, dimethyl sulfate is added to a turbulent stream of the refortified liquid ahead of the inlet of a pump 7.

The pump 7 following the inlet point of the dimethyl sulfate is preferably a centrifugal pump so as to effect a rapid almost instantaneous mixing of the dimethyl sulfate with the aqueous sodium phenate so that local excesses of the dimethyl sulfate are avoided.

A homogeneous liquid mass flows from pump 7 into heat exchanger 3. In the heat exchanger, sufficient heat is introduced into the reacting mass to effect substantial completion of the anisole forming reaction and to steam distill anisole present in the mass. The heated reacting mass then leaves the heat exchanger thru pipe 2 and is expanded into still 1 at point 4 as previously described.

The items in the drawing which have not yet been referred to relate to the recovery of the product anisole and the by-product sodium sulfate and they will be considered in more detail later.

Turning now to a consideration in greater detail of the operating conditions of applicant's preferred process illustrated by the drawing, it is to be noted at the outset that still 1 contains a volume of aqueous sodium phenate which is large compared with the volume of materials added to the process per minute. For example, according to a preferred embodiment, the process is operated so that there is maintained in the still from 500 to 1500 gallons of aqueous sodium phenate for each gallon of materials added to the process per minute. Additionally the process is operated so that the amount of aqueous sodium phenate withdrawn for recycle is only a fraction of the volume contained in the still. For example, the volume of aqueous sodium phenate in the still is preferably from 2 to 6 gallons for each gallon of the solution withdrawn per minute for recycle.

The retention of a large body of aqueous sodium phenate in the still serves a multiple function. The liquid body in the still acts as a reservoir for the reactant, sodium phenate, as a source of constant supply of a uniform liquid to serve as a diluent in the reaction process and in general as a "flywheel" for the process; that is, the body of liquid in the still has a function which is analogous to a flywheel in a machine in that the body of liquid acts to moderate and minimize, because of its mass, fluctuations and variations in the addition of reactants, temperatures and usual process variables, thus stabilizing the process.

As mentioned previously, sodium hydroxide and phenol are introduced thru pipes 10 and 11, respectively, into hot aqueous sodium phenate withdrawn from still 1 thru line 5. The sodium hydroxide and the phenol are added in substantially stoichiometric proportions for the formation of sodium phenate to form what has been termed the refortified aqueous sodium phenate. It is preferred that the aqueous sodium phenate solution in the reaction cycle be maintained substantially neutral, that is, that where there be no appreciable excess of either sodium hydroxide or phenol in the liquid mass. To maintain this neutral condition, it may be necessary occasionally to add more than the stoichiometric amount of sodium hydroxide but ordinarily once the process has been operated for awhile and stabilized at uniform conditions, it is not necessary to vary the sodium hydroxide and phenol from approximately stoichiometric proportions.

The refortified aqueous solution of sodium phenate should contain at least 28 per cent by weight of sodium phenate and more preferably it contains from 35 thru 45 per cent sodium phenate. Accordingly the addition of sodium hydroxide and phenol to the recycle aqueous sodium phenate withdrawn from still 1 to effect the refortification is controlled to maintain uniformly a predetermined sodium phenate concentration consistent with the stated limitation.

Although the diagram shows the separate addition of sodium hydroxide and phenol to the recycle aqueous sodium phenate, it will be understood that the sodium hydroxide and the phenol could first be brought together to form sodium phenate and this product then added directly to the recycle aqueous sodium phenate. Alternatively, instead of adding the sodium hydroxide and phenol separately to the recycle aqueous sodium phenate in line 5, these reactants may be introduced into the still at a point immediately adjacent the point where pipe 5 leaves the still; or a product, sodium phenate, formed externally to the recycle system could be introduced into the still at the same point.

The sodium hydroxide and the phenol may be introduced into the system in any convenient form. For example, the sodium hydroxide may be added in the form of an aqueous solution, say 50 per cent sodium hydroxide. As for the phenol, it is conveniently added as the molten product.

The dimethyl sulfate which is to be reacted with sodium phenate to give anisole is introduced into the stream of refortified aqueous sodium phenate thru line 12. The advantages of the processes of the invention are most fully realized by adding the dimethyl sulfate to a turbulent stream of refortified aqueous sodium phenate preceding a centrifugal pump so that there is a rapid intimate mixing and local excesses of the dimethyl sulfate in the reaction mass are avoided. The solubility of the dimethyl sulfate will, of course, vary somewhat with the strength of the sodium phenate solution. Preferably the rate of addition is from 0.5 thru 1.0 part by weight of dimethyl sulfate per 1000 parts by weight of the refortified aqueous sodium phenate solution.

According to the invention, the rate of addition of dimethyl sulfate is also coordinated with the additions of sodium hydroxide and phenol so that these three reactants are introduced into the system in substantially the stoichiometric proportions required for the formation of anisole. In other words, substantially one-half mol of dimethyl sulfate is added for each mol of phenol added to the system.

The homogeneous liquid leaving pump 7 passes into heat exchanger 3. In the heat exchanger the reacting mass is heated to a temperature above 106° C. and preferably to a temperature of 108° C. thru 115° C. The reacting mass in the heat exchanger is maintained under pressure, preferably a pressure of 15 thru 45 pounds per sq. inch gauge. Sufficient heat is introduced into the reacting mass to steam distill the anisole present in the mass.

As pointed out previously, the heated reacting mass from the heat exchanger is passed into the vapor space of still 1. Preferably the heated mass is expanded tangentially into the vapor space of the still at point 4, thus imparting a rotatory motion to the heated mass as it is introduced into the distillation zone.

Upon expansion into the vapor space of the distillation zone, a mixture of anisole and water flashes off from the heated mass. The ratio of water to anisole in the vapors which flash off will vary somewhat with the operating conditions but will generally be in the order of about 3 parts by weight of water for each part by weight of anisole. The vaporized anisole-water mixture is withdrawn thru pipe 8 and the unvaporized portion of the heated reacting mass drops into the body of hot aqueous sodium phenate solution 13 which is maintained in the still 1.

The temperature of the body of hot aqueous sodium phenate in the still is kept above 100° C. and preferably from 104° C. thru 109° C. By reducing the pressure slightly in the distillation zone a temperature in the lower portion of this range may be used, whereby crystallizing out of sodium sulfate in the heat exchanger is avoided. Crystalline sodium sulfate which is produced in the anisole-forming reaction settles in the hot body of aqueous sodium phenate and collects in the conical bottom of the still body.

Turning now to a consideration of the recovery of anisole from the vapors leaving still 1 and having reference to the drawing, it will be noted first that the vapors pass thru condenser 14 wherein they are cooled and liquefied. The condensed mixture then flows thru line 15 into separator 16. In the separator the condensed anisole and the condensed water are allowed to separate by gravity, the anisole forming the upper layer. This upper layer, the product anisole, is then withdrawn from the system thru line 17.

The gravity separation is most readily effected by maintaining the liquids in the separator at a slightly elevated temperature, preferably between 25 and 45° C. Water withdrawn from the bottom of the separator thru line 18 may be discarded, used in subsequent process steps, or more preferably, as shown in the drawing, is returned thru the still level adjuster 19 into still 1.

Considering now the recovery of by-product, sodium sulfate, which is formed in the reaction of sodium phenate with dimethyl sulfate, it will be seen, according to the preferred embodiment of the invention illustrated in the drawing, that a slurry of the crystalline sodium sulfate in aqueous sodium phenate is withdrawn from the bottom of the still 1 and pumped continuously thru line 9 into a continuous centrifuge 20. Aqueous sodium phenate separated from the crystalline sodium sulfate in the centrifuging step is returned to the still thru line 21. Water used to wash the solid sodium sulfate in the centrifuging step may also be returned to the still.

Other methods for recovering the by-product, sodium sulfate, may also be used. For example, the cone bottom of the reactor may be connected to an inclined pipe in which is located a conveyer screw adapted for advancing the precipitated sodium sulfate up the incline counter-current to wash water to a point above the liquid level in the reactor tank and ultimately discharging a drained sodium sulfate crystal.

Although the invention has been described with particular reference to the use of dimethyl sulfate as a methylating agent, it will be understood that any one of a variety of inorganic and organic methyl esters having a labile methyl group may also be used in the processes of the invention. Suitable methylating agents for phenol include, for example, a methyl sulfate having the methyl group directly attached to the sulfate radical such as dimethyl sulfate, sodium methyl sulfate, potassium methyl sulfate, ammonium methyl sulfate, or methyl acid sulfate; also methyl halides such as methyl chloride, methyl iodide, and methyl bromide; and organic methyl esters such as methyl acetate. Of course, if the methyl acid sulfate is used, it will be necessary to add a stoichiometric amount of alkali to maintain the reaction mass in the desired neutral condition.

Instead of sodium hydroxide, which was set out as a reactant in the illustrative processes of the invention described heretofore, one may use other alkaline or basic sodium compounds, specifically a sodium carbonate such as sodium carbonate or sodium bicarbonate.

While certain specific processes have been shown in the foregoing disclosure for effecting the separation of anisole from unreacted sodium phenate, it will be understood that one skilled in the art may readily employ other techniques for effecting such separation without departing from the spirit of this invention. For example, the reaction mass leaving the heating zone may be separated into two liquid phases, an anisole phase and an aqueous sodium phenate phase, and the anisole phase withdrawn from the cyclic system.

Reviewing it will be seen that the invention in its broad aspect relates to processes in which a methylating agent for phenol is added to a stream of refortified aqueous solution of sodium phenate maintained in a turbulent flow, the rate of addition being such that the methylating agent does not exceed its solubility in the solution. A liquid reacting mass is thus obtained and anisole is formed in the stream of aqueous sodium phenate by passing the liquid reacting mass thru a heating zone. Next the anisole which has been formed is separated from the unreacted sodium phenate. Phenol and an alkaline sodium compound selected from the group consisting of sodium hydroxide and a sodium carbonate are added continuously in substantially equimolecular proportions to at least a portion of the unreacted aqueous sodium phenate to form the aforementioned refortified aqueous solution of sodium phenate. The refortified aqueous solution is continuously cycled and admixed with the methylating agent, as mentioned above, thus forming a cyclic process. The phenol, the alkaline sodium salt, and the methylating agent are introduced into the system in substantially the stoichiometric proportions required for the formation of anisole.

I claim:

1. In a continuous process for the manufacture of anisole, the steps comprising adding a methylating agent for phenol to a stream of refortified aqueous solution of sodium phenate maintained in turbulent flow, the rate of addition being such that the methylating agent does not exceed its solubility in the solution whereby a liquid reacting mass is obtained, forming anisole in the stream of aqueous sodium phenate by passing the liquid reacting mass thru a heating zone, separating the anisole formed from unreacted aqueous sodium phenate, adding phenol and an alkaline sodium compound selected from the group consisting of sodium hydroxide and a sodium carbonate continuously in substantially equimolecular proportions to at least a portion of the unreacted aqueous sodium phenate to form said refortified aqueous solution of sodium phenate, and continuously cycling a stream of the refortified sodium phenate for admixture with said methylating agent as aforementioned, said additions of phenol, alkaline sodium compound, and methylating agent being in substantially the stoichometric proportions required for the formation of anisole.

2. In a continuous process for the manufacture of anisole, the steps comprising adding dimethyl sulfate to a stream of refortified aqueous solution of sodium phenate maintained in turbulent flow, the rate of addition being such that the methylating agent does not exceed its solubility in the solution whereby a liquid reacting mass is obtained, forming anisole in the stream of aqueous sodium phenate by passing the liquid reacting mass thru a heating zone, separating the anisole formed from unreacted aqueous sodium phenate, adding phenol and sodium hydroxide in substantially equimolecular proportions to at least a portion of the unreacted aqueous sodium phenate to form said refortified aqueous solution of sodium phenate, and continuously cycling a stream of the refortified sodium phenate for admixture with said dimethyl sulfate as aforementioned, said additions of phenol, sodium hydroxide, and dimethyl sulfate being in substantially the stoichiometric proportions required for the formation of anisole.

3. In a continuous process for the manufacture of anisole, the steps comprising adding methyl chloride to a stream of refortified aqueous solution of sodium phenate maintained in turbulent flow, the rate of addition being such that the methylating agent does not exceed its solubility in the solution whereby a liquid reacting mass is obtained, forming anisole in the stream of aqueous sodium phenate by passing the liquid reacting mass thru a heating zone, separating the anisole formed from unreacted aqueous sodium phenate, adding phenol and sodium hydroxide in substantially equimolecular proportions to at least a portion of the unreacted aqueous sodium phenate to form said refortified aqueous solution of sodium phenate, and continuously cycling a stream of the refortified sodium phenate for admixture with said methyl chloride as aforementioned, said additions of phenol, sodium hydroxide, and methyl chloride being in substantially the stoichiometric proportions required for the formation of anisole.

4. In a continuous process for the manufacture of anisole, the steps comprising adding a methyl sulfate to a stream of a refortified aqueous solution of sodium phenate maintained in turbulent flow, the rate of addition being such that the methyl sulfate does not exceed its solubility in the solution whereby a liquid reacting mass is formed, passing the liquid reacting mass thru a heating zone and heating the mass therein to a temperature above about 106° C., flashing the heated liquid into the vapor space of a distillation zone which contains a body of hot aqueous sodium phenate whereby a mixture of anisole and water is vaporized and aqueous sodium phenate solution from the reacting mass is added to the body of hot aqueous sodium phenate in the distillation zone, withdrawing the vaporized mixture of anisole and water from the distillation zone, condensing the withdrawn vapors and separating the condensed anisole from the condensed water, adding sodium hydroxide and phenol continuously in substantially equimolecular proportions to at least a portion of said body of hot aqueous sodium phenate to form said refortified aqueous solution of sodium phenate and continuously cycling a stream of the refortified sodium phenate for admixture with said methyl sulfate as aforementioned, said additions of sodium hydroxide, phenol and methyl sulfate being in substantially the stoichiometric proportions required for the formation of anisole.

5. In a continuous process for the manufacture of anisole, the steps comprising adding dimethyl sulfate to a stream of a refortified aqueous solution of sodium phenate maintained in turbulent flow, the rate of addition being such that the dimethyl sulfate does not exceed its solubility in the solution, whereby a liquid reacting mass is formed, passing the liquid reacting mass thru a heating zone and heating the mass therein to a temperature above about 106° C., flashing the heated liquid into the vapor space of a distillation zone which contains a body of hot aqueous sodium phenate whereby a mixture of anisole and water is vaporized and aqueous sodium phenate solution from the reacting mass is added to the body of hot aqueous sodium phenate in the distillation zone, withdrawing vaporized anisole-water mixture from the distillation zone, condensing the withdrawn vapors and separating the condensed anisole from the condensed water, adding sodium hydroxide and phenol continuously in substantially equimolecular proportions to at least a portion of said body of hot aqueous sodium phenate and mixing to form said refortified aqueous solution of sodium phenate, and continuously cycling a stream of the refortified sodium phenate for admixture with said dimethyl sulfate as aforementioned, said sodium hydroxide and phenol each being added to the hot aqueous sodium phenate in the proportion of about 2 mols per mol of dimethyl sulfate added to the refortified aqueous sodium phenate solution.

6. In a continuous process for the manufacture of anisole, the steps comprising adding methyl chloride to a stream of a refortified aqueous solution of sodium phenate maintained in turbulent flow, the rate of addition being such that the methyl chloride does not exceed its solubility in the solution, whereby a liquid reacting mass is formed, passing the liquid reacting mass thru a heating zone and heating the mass therein to a temperature above about 106° C., flashing the heated liquid into the vapor space of a distillation zone which contains a body of hot aqueous sodium phenate whereby a mixture of anisole and water is vaporized and aqueous sodium phenate solution from the reacting mass is added to the body of hot aqueous sodium phenate in the distillation zone, withdrawing vaporized anisole-water mixture from the distillation zone, condensing the withdrawn vapors and separating the condensed anisole from the condensed water, adding sodium hydroxide and phenol continuously in substantially equimolecular proportions to at least a portion of said body of hot aqueous sodium phenate and mixing to form said refortified aqueous solution of sodium phenate, and continuously cycling a stream of the refortified sodium phenate for admixture with said methyl chloride as aforementioned, said sodium hydroxide and phenol each being added to the hot aqueous sodium phenate in the proportion of about one mol per mol of methyl chloride added to the refortified aqueous sodium phenate solution.

7. In a continuous process for the manufacture of anisole, the steps comprising continuously adding dimethyl sulfate to a turbulent stream of a refortified aqueous solution containing 35 per cent thru 45 per cent by weight of sodium phenate the rate of addition being from 0.5 thru 1.0 part by weight of dimethyl sulfate per 1000 parts by weight of the refortified aqueous solution whereby a liquid reacting mass containing the dimethyl sulfate in solution is formed, passing the liquid reacting mass thru a heating zone at a pressure of 15 thru 45 pounds per sq. inch and heating the mass therein to a temperature of 108° C. thru 115° C., expanding the heated mass tangentially into the vapor space of a distillation zone which contains a body of aqueous sodium phenate at a temperature of 104° C. thru 109° C., whereby a rotatory motion is imparted to the said heated mass and a mixture of anisole and water is vaporized while aqueous sodium phenate solution from the heated mass remains and adds to said body of aqueous sodium phenate in the distillation zone, withdrawing the vaporized anisole-water mixture from the distillation zone, condensing the withdrawn vapors, separating the condensed anisole from the condensed water, continuously withdrawing a stream of aqueous sodium phenate from the said body of aqueous sodium phenate in the distillation zone, adding sodium hydroxide and phenol continuously to said withdrawn stream in substantially equimolecular proportions and mixing to form said refortified aqueous solution containing 35 per cent thru 45 per cent sodium phenate for admixture with said dimethyl sulfate as aforementioned, said sodium hydroxide and phenol each being added to the aqueous sodium phenate in the proportion of about 2 mols per mol of dimethyl sulfate added to the turbulent stream of refortified aqueous sodium phenate solution, withdrawing solid crystalline sodium sulfate from the distillation zone and introducing water into the process as required to keep the water content of the body of aqueous sodium phenate in the distillation zone substantially uniform.

WALTER D. SMUTZ.

No references cited.